US008744789B2

(12) United States Patent
Hanley

(10) Patent No.: US 8,744,789 B2
(45) Date of Patent: Jun. 3, 2014

(54) UTILITY METERS CONFIGURED TO EXECUTE MULTIPLE COLLECTION AGENTS

(75) Inventor: James Patrick Hanley, Decatur, GA (US)

(73) Assignee: General Electric Company, Schenectady, NY (US)

( * ) Notice: Subject to any disclaimer, the term of this patent is extended or adjusted under 35 U.S.C. 154(b) by 330 days.

(21) Appl. No.: 13/194,246

(22) Filed: Jul. 29, 2011

(65) Prior Publication Data

US 2013/0030733 A1 Jan. 31, 2013

(51) Int. Cl.
*G06F 19/00* (2011.01)
*G01R 21/00* (2006.01)

(52) U.S. Cl.
USPC ............................................ 702/62; 700/291

(58) Field of Classification Search
USPC .................. 702/60–62; 700/291; 705/412
See application file for complete search history.

(56) References Cited

U.S. PATENT DOCUMENTS

2002/0077729 A1* 6/2002 Anderson ..................... 700/291

FOREIGN PATENT DOCUMENTS

GB 2465800 A 6/2010
WO 98/19380 A1 5/1998

OTHER PUBLICATIONS

Search Report issued in connection with GB Application No. 1213376.5, Nov. 23, 2012.

* cited by examiner

*Primary Examiner* — Manuel L Barbee
(74) *Attorney, Agent, or Firm* — Sutherland Asbill & Brennan LLP

(57) ABSTRACT

Utility meters configured to execute multiple collection agents are provided. In this regard, communication may be facilitated with a plurality of utility providers. A utility meter that includes one or more computer processors may be configured to execute a first software agent configured to collect utility usage data on behalf of a first utility provider. Additionally, the utility meter may be configured to execute a second software agent concurrently with the first software agent. The second software agent may be configured to collect utility usage data on behalf of a second utility provider.

18 Claims, 5 Drawing Sheets

UTILITY METERS CONFIGURED TO EXECUTE MULTIPLE COLLECTION AGENTS

FIELD OF THE INVENTION

Embodiments of the invention relate generally to utility meters, and more specifically to utility meters configured to execute multiple collection agents associated with respective utility providers.

BACKGROUND OF THE INVENTION

Utility meters, such as power meters, are typically utilized to monitor utility consumption or usage. In many cases, a utility meter may be a smart utility meter configured to monitor usage and communicate usage data to a utility provider. In order to facilitate communication with a utility provider, the utility meter typically includes an interface configured to communicate over an Advanced Metering Infrastructure ("AMI") network. However, conventional utility meters only include a single AMI interface capable of facilitating communication with a single utility provider. With a more competitive utility market, it is possible that multiple utility providers will provide resources to a structure monitored by the utility meter. For example, a consumer may purchase power from separate power companies based upon current market rates. Accordingly, there is an opportunity for improved utility meters capable of executing multiple collection agents or multiple AMI agents that facilitate communication with a plurality of respective utility providers.

BRIEF DESCRIPTION OF THE INVENTION

Some or all of the above needs and/or problems may be addressed by certain embodiments of the invention. Embodiments of the invention may include utility meters and associated methods that facilitate the execution of a plurality of collection agents. In this regard, communication may be facilitated with a plurality of utility providers. According to one embodiment of the invention, there is disclosed a method for executing collection agents by a utility meter. A utility meter that includes one or more computer processors may be configured to execute a first software agent configured to collect utility usage data on behalf of a first utility provider. Additionally, the utility meter may be configured to execute a second software agent concurrently with the first software agent. The second software agent may be configured to collect utility usage data on behalf of a second utility provider.

According to another embodiment of the invention, there is disclosed a utility meter. The utility meter may include at least one memory, and at least one processor. The at least one memory may be configured to store computer-executable instructions associated with a first software agent and a second software agent. The at least one processor may be configured to access the at least one memory and execute the computer-executable instructions to execute the first software agent to collect utility usage data on behalf of a first utility provider; and execute the second software agent to collect utility usage data on behalf of a second utility provider.

Additional systems, methods, apparatus, features, and aspects are realized through the techniques of various embodiments of the invention. Other embodiments and aspects of the invention are described in detail herein and are considered a part of the claimed invention. Other embodiments, features, and aspects can be understood with reference to the description and the drawings.

BRIEF DESCRIPTION OF THE DRAWINGS

Figure 1:
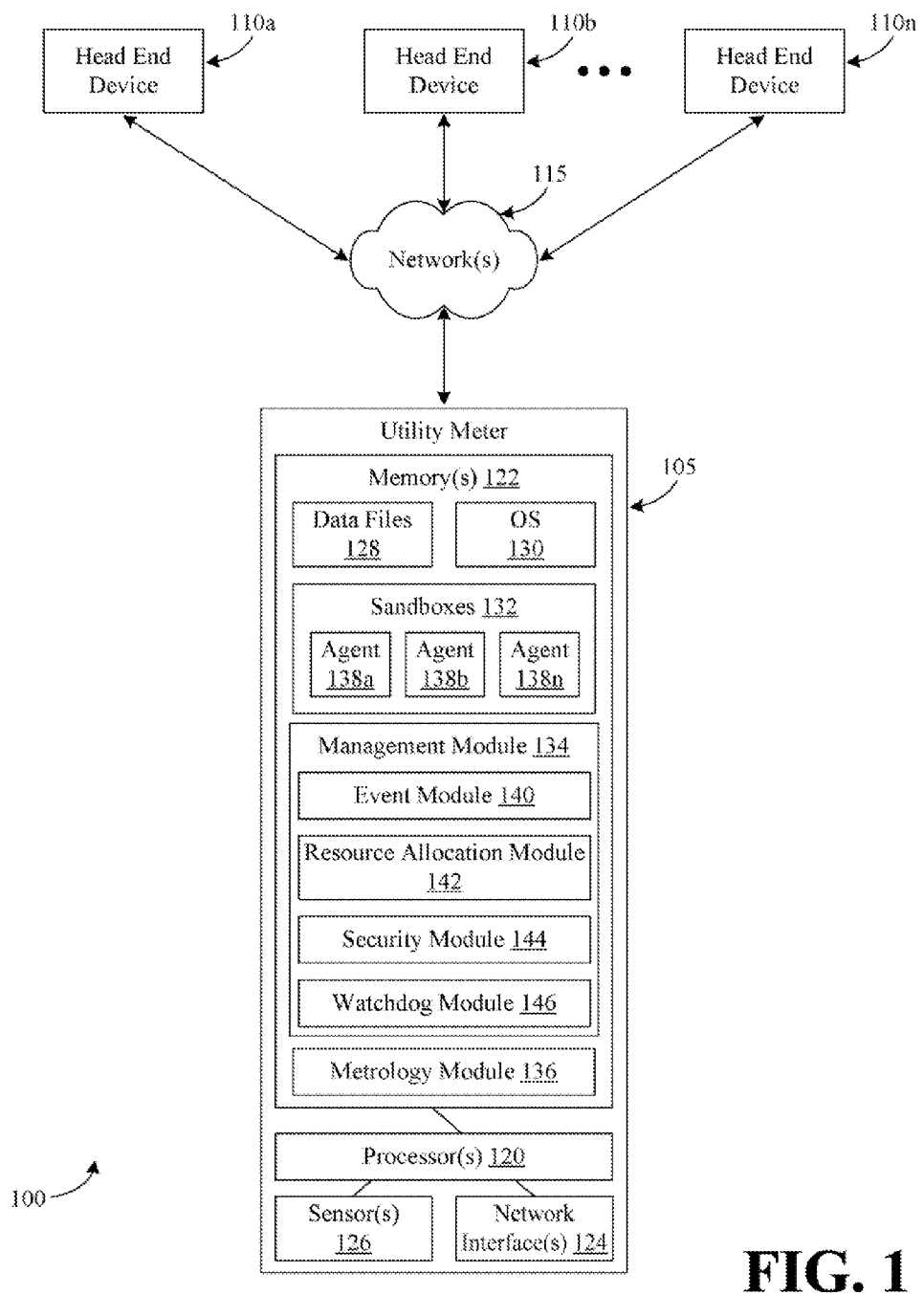

Having thus described the invention in general terms, reference will now be made to the accompanying drawings, which are not necessarily drawn to scale, and wherein:

FIG. 1 is a block diagram of one example system that facilitates execution and management of multiple collection agents by a utility meter, according to an illustrative embodiment of the invention.

Figure 2:
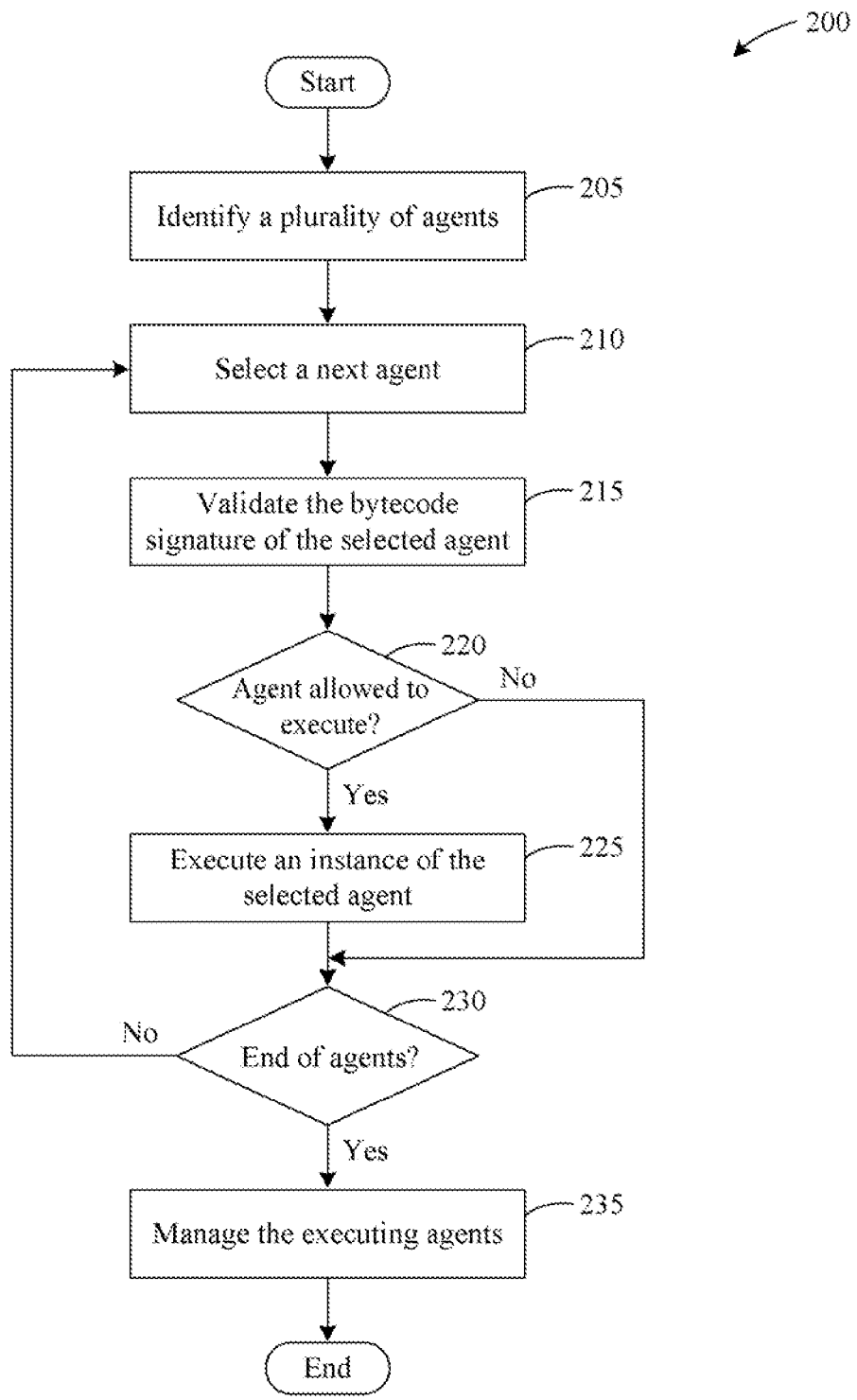

FIG. 2 is a flow diagram of an example method for executing and managing multiple collection agents by a utility meter, according to an illustrative embodiment of the invention.

Figure 3:
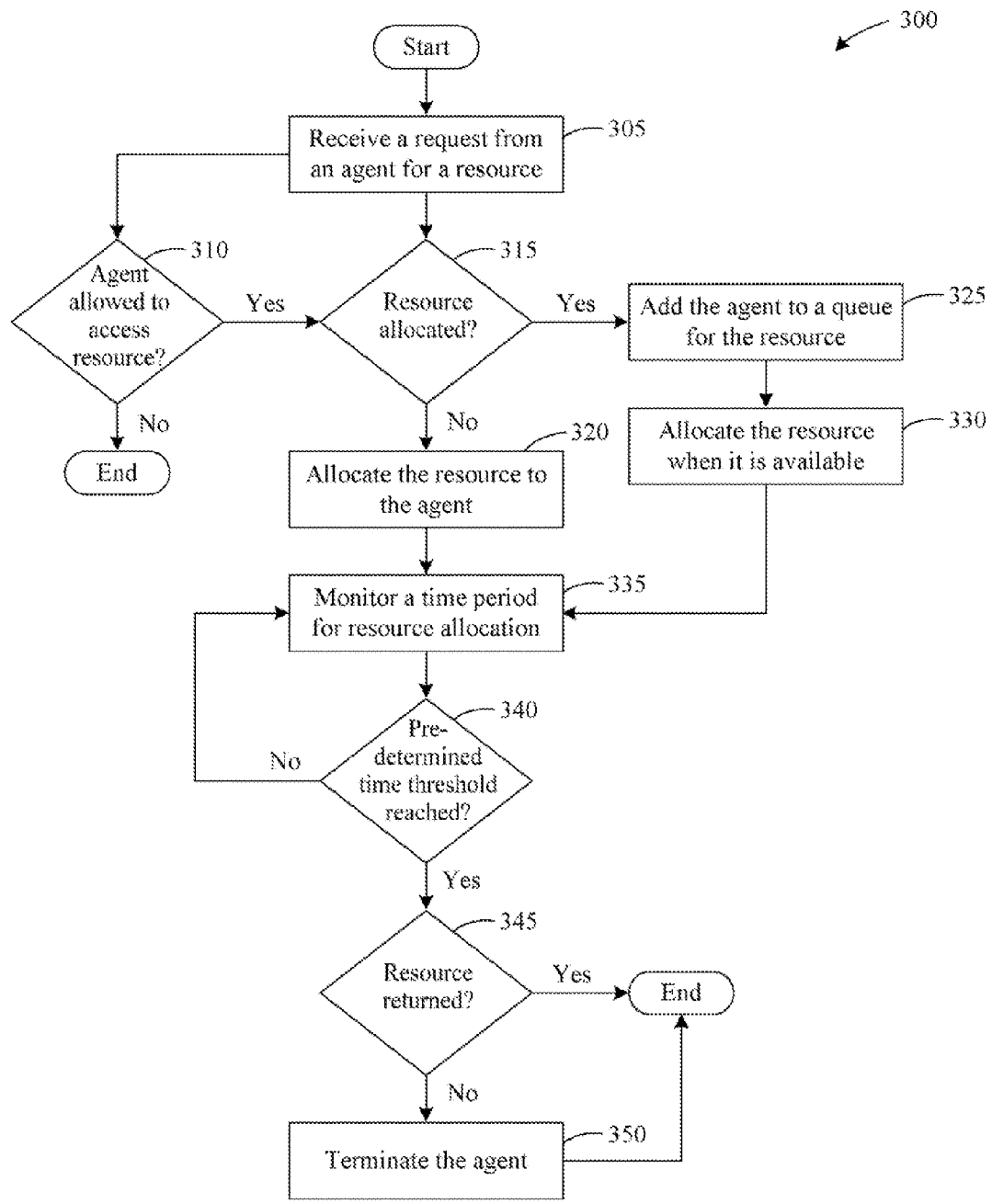

FIG. 3 is a flow diagram of an example method for managing the allocation of resources to multiple collection agents, according to an illustrative embodiment of the invention.

Figure 4:
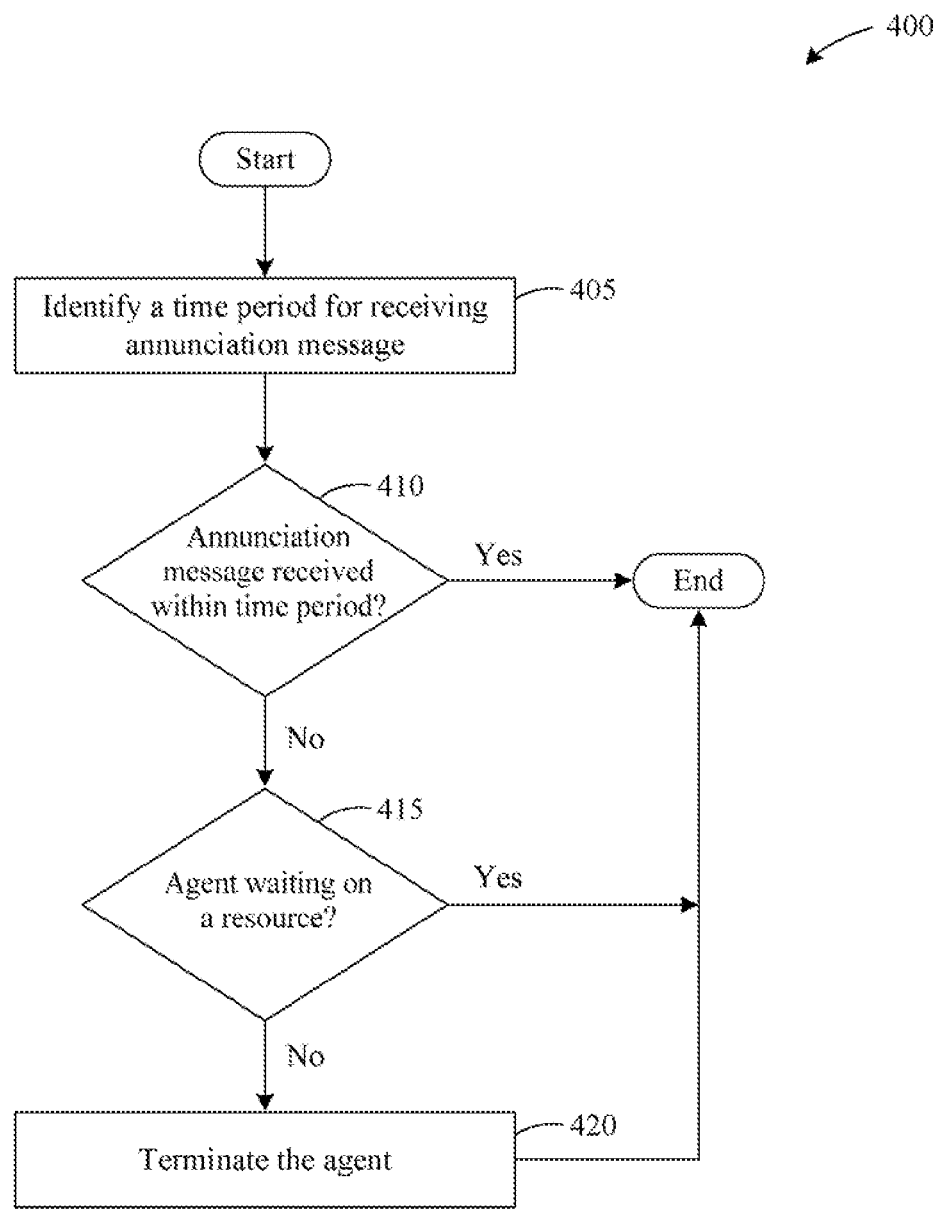

FIG. 4 is a flow diagram of an example method for terminating collection agents that have timed out, according to an illustrative embodiment of the invention.

Figure 5:
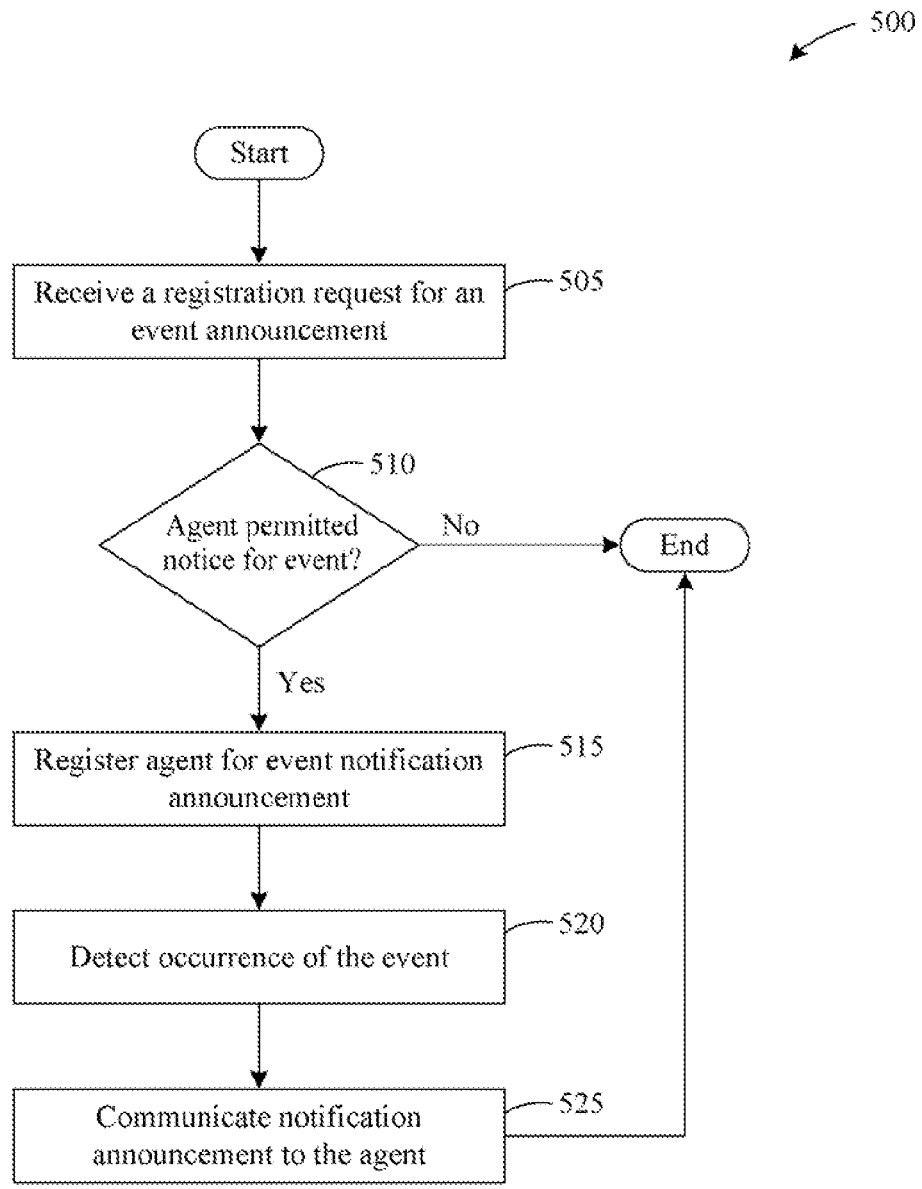

FIG. 5 is a flow diagram of an example method for communicating event notifications to collection agents, according to an illustrative embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are various systems, methods, and apparatus for facilitating the execution of a plurality of data collection agents by utility meters. In certain embodiments of the invention, a utility meter may be configured to concurrently execute a plurality of data collection agents or Advanced Metering Infrastructure ("AMI") agents. In this regard, communication may be facilitated between the utility meter and any number of external systems, such as AMI head end systems associated with a plurality of different utility providers. Accordingly, the utility meter and its associated customer(s) may be permitted to purchase and monitor the consumption of utilities provided by any number of utility providers. In one example embodiment, a utility meter may be configured to execute a first software agent or data collection agent configured to collect utility usage data on behalf of a first utility provider. Additionally, the utility meter may be configured to concurrently execute a second software agent configured to collect utility usage data on behalf of a second utility provider. Although only two software agents are described as being executed, the utility meter may concurrently execute any number of software agents.

According to an aspect of the invention, the utility meter may additionally manage the operation of the agents and/or control the allocation of resources to the agents and/or the security associated with the agents. For example, the various agents may be executed in a "sandbox" mode. In this regard, a relatively tightly controlled environment may be provided in order to enhance security within the utility meter and protect utility meter resources. As desired, the utility meter may execute any number of modules or applications that facilitate the monitoring of the agents, the allocation of resources to the agents, and/or the provision of event notifications to the agents. For example, a resource allocation module, a security module, a watchdog module, and/or an event module may be executed by the meter in order to manage the operation of the agents. As desired, any number of modules or applications may be utilized, and the operations described for certain modules may be combined into or performed by any number of modules.

In certain embodiments of the invention, the allocation of resources to the various agents may be controlled by the utility meter. For example, a resource allocation module may track a wide variety of metrology resources, such as stored data parameters, measurements, and/or configuration parameters, and the resource allocation module may control the access of these resources by the agents. In one example embodiment, the resource allocation module may receive and process agent requests for resources. Once a resource request is received, a determination may be made as to whether the agent has permission to access the requested resource. For example, a suitable security module or security component may determine whether the requesting agent has permission to access the requested resource. In the event that the agent has permission to access the requested resource, a determination may be made as to whether the resource has been allocated to another agent. If the resource has been allocated to another agent, then the requesting agent may be placed in a waiting queue for the resource. Otherwise, if the resource is available, then the resource may be allocated or assigned to the requesting agent. Other agents are not permitted to modify the resource while it is allocated to the requesting agent. Additionally, once the resource has been allocated, a suitable watchdog module or component may monitor an amount of time that the agent maintains the resource. In the event that the agent does not release the resource within a predetermined threshold period of time, then the watchdog module may terminate the agent in order to allow other agents an opportunity to access the resource.

Additionally, in certain embodiments of the invention, the watchdog module may monitor the execution of the various agents and terminate unresponsive agents. For example, each agent may be required to periodically announce itself to the watchdog module. In the event that an announcement is not received from an agent within a predetermined period of time, a determination may be made as to whether the agent is waiting for a resource that is locked by or allocated to another agent. In the event that the agent is waiting for a resource, then the agent may be allowed to continue execution. If, however, it is determined that the agent is not waiting for a resource, then the agent may be terminated and optionally restarted.

As desired, certain embodiments of the invention may perform a wide variety of security determinations with respect to the agents. For example, the bytecode signature of an agent may be examined and/or validated by a suitable security component prior to the execution of the agent. In this regard, a determination may be made as to whether the bytecode and/or agent is permitted to execute on the utility meter. Once an agent has been executed, an initialization routing may configure the agent. For example, the agent may be configured via an application programming interface ("API") associated with the utility meter. During initialization, the agent may access various resources to facilitate the configuration. Additionally, during initialization and/or at another point in time, the agent may request registration for a wide variety of events and/or timers. An event module or announcement module may receive and process the registration requests. In the event that an agent is permitted to receive a notification or announcement of a desired event (e.g., a predetermined condition, a timer event, etc.), then the event module may register the agent for the desired event. Upon occurrence of the desired event, the event module may communicate an event announcement to the agent. As desired, the event module may asynchronously communicate announcements to any number of agents.

Various embodiments of the invention may include one or more special purpose computers, systems, and/or particular machines that facilitate the execution of a plurality of collection agents by a utility meter. A special purpose computer or particular machine may include a wide variety of different software modules as desired in various embodiments. As explained in greater detail below, in certain embodiments, these various software components may be utilized to facilitate the execution and management of a plurality of collection agents. In this regard, a utility meter may collect data on behalf of and/or communicate with any number of head end systems, such as head end systems associated with a plurality of different utility providers.

Certain embodiments of the invention described herein may have the technical effect of facilitating the execution of multiple collection agents and/or AMI agents by a utility meter. For example, a plurality of agents may be executed by a utility meter in a sandbox mode. Additionally, embodiments of the invention may have the technical effect of managing the plurality of agents and allocating resources to the plurality of collection agents. As a result of executing a plurality of agents, a utility meter may be configured to communicate with a plurality of head end systems and/or to collect data on behalf of a plurality of head end systems. For example, the utility meter may be configured to collect usage data on behalf of a plurality of utility providers and to communicate with a plurality of head end systems associated with the utility providers.

FIG. 1 is a block diagram of one example system 100 that facilitates execution and management of multiple collection agents by a utility meter, according to an illustrative embodiment of the invention. The system 100 illustrated in FIG. 1 may include a utility meter 105, any number of head end devices 110a-n, and/or one or more networks 115. The utility meter 105 may be configured to monitor utility usage for a structure, such as a residence or a business. For example, the utility meter 105 may be a power meter configured to monitor electrical usage. According to an aspect of the invention, the utility meter 105 may be configured to execute a plurality of collection agents that respectively facilitate the collection of data on behalf of the various head end devices 110a-n and/or communication with the various head end devices 110a-n.

With reference to FIG. 1, the utility meter 105 may be any suitable utility meter, such as a suitable electrical meter, water meter, or gas meter. The utility meter 105 may be configured to measure an amount of utility usage (e.g., electrical usage, etc.) supplied to an associated residence, business, or machine. In certain embodiments, the utility meter 105 may be a smart meter or an advanced meter configured to identify consumption in relatively greater detail than a conventional meter. For example, a smart power meter may facilitate real-time or near real-time readings, power outage notifications, and/or power quality monitoring.

The utility meter 105 may include any number of suitable computer processing components that facilitate the general operation of the utility meter 105 and/or the execution of various computer-executable instructions that facilitate the collection of usage data and/or the communication of usage data. Examples of suitable processing devices that may be incorporated into a utility meter 105 include, but are not limited to, application-specific circuits, microcontrollers, minicomputers, other computing devices, and the like. As such, the utility meter 105 may include any number of processors 120 that facilitate the execution of computer-readable instructions to control the operations of the utility meter 105. By executing computer-readable instructions, the utility meter 105 may include or form a special purpose computer that facilitates the collection of utility usage data and/or communication with any number of head end devices 110*a-n*.

In addition to one or more processor(s) 120, the utility meter 105 may include one or more memory devices 122, one or more network interfaces 124, and/or one or more sensors 126. The one or more memory devices 122 or memories may be any suitable memory devices, for example, caches, read-only memory devices, random access memory devices, magnetic storage devices, etc. The one or more memory devices 122 may store data, executable instructions, and/or various program modules utilized by the utility meter 105, for example, data files 128, an operating system ("OS") 130, one or more sandboxes 132, a management module 134, and/or a metrology module 136. The data files 128 may include, for example, information associated with the operation of the utility meter 105, measurements and/or readings data collected by the utility meter 105, information associated with a monitored structure, information associated with one or more head end devices 110*a-n*, bytecode information for one or more collection agents or agents 138*a-n*, and/or information associated with the execution and/or monitoring of the agents 138*a-n*.

In certain embodiments of the invention, the utility meter 105 may include any number of software applications, modules, or other computer-executable instructions that are executed to facilitate the operations of the utility meter 105. The software applications may include computer-readable instructions that are executable by the one or more processors 120. The execution of the computer-readable instructions may form a special purpose computer that facilitates the operations of the utility meter 105 as well as the execution and/or monitoring of the agents 138*a-n*. As an example of a software application, the utility meter 105 may optionally include an OS 130 that controls the general operation of the utility meter 105 and that facilitates the execution of additional software applications.

According to an aspect of the invention, the utility meter 105 may be configured to execute a plurality of collection agents 138*a-n* that facilitate the collection and/or communication of utility usage data on behalf of a wide variety of different entities. For example, each agent 138*a-n* may be associated with a respective head end device 110*a-n* which may be, for example, associated with respective utility providers (e.g., electrical power providers, etc.). As illustrated in FIG. 1, the agents 138*a-n* may be executed within the one or more sandboxes 132 in order to provide secure execution of the agents 138*a-n* and/or control of resources (e.g., metrology data, etc.) by the agents 138*a-n*. Sandboxing may refer to a mechanism for separating running or executing programs (e.g., the agents 138*a-n*). A sandbox may provide a relatively tightly controlled set of resources for a guest program to run in, such as scratch space. Network access for the executing programs may also be restricted.

According to an aspect of the invention, each of the agents 138*a-n* (individually referred to as an agent 138) may be executed within a sandbox 132. For example, an agent 138 may be a suitable applet or other program whose execution may be managed by the utility meter 105. In certain embodiments, each agent 138 may be associated with a respective head end device 110, and the agent 138 may facilitate the collection of data on behalf of the head end device 110. For example, a programmer associated with a head end device 110 may utilize a publishable interface associated with the utility meter 105 to develop an agent 138 that may be provided to the utility meter 105 and executed to facilitate data collection and/or communication with the head end device 110 via the networks 115. An agent 138 may be provided to the utility meter 105 utilizing a wide variety of suitable techniques, such as network transmission or manual installation from a removable memory device. During execution, an agent 138 may perform a wide variety of different operations, such as the monitoring and/or collection of utility usage data, the generation of reports and/or messages associated with the usage data, the determination of billing information associated with utility usage, the identification of various alert and/or alarm conditions, and/or the communication of messages (e.g., usage messages, alert messages, etc.) to a head end device 110.

According to an aspect of the invention, the utility meter 105 may execute a plurality of agents 138*a-n* concurrently or simultaneously. Given the concurrent execution, the utility meter may manage the execution of the agents 138*a-n* and/or the allocation of resources to the agents 138*a-n*. The management module 134 may include any number of suitable components or modules configured to manage the execution of the agents 138*a-n*. For example, as shown in FIG. 1, the management module 134 may include an event module 140, a resource allocation module 142, a security module 144, and/or a watchdog module 146. The illustrated modules are provided by way of example only. Indeed, any number of modules may be utilized as desired to perform the operations of the management module 134. Additionally, certain operations of the illustrated modules or components may be combined or further distributed.

The event module 140 may be a suitable module that facilitates the receipt and/or processing of agent requests for event notifications and/or event registrations. In operation, the agents 138*a-n* may request various announcements or notifications from the event module 140, such as notifications associated with the occurrence of predetermined events (e.g., metrology events, collection of metrology data, etc.) and/or notifications associated with various timers and/or time monitoring (e.g., hourly notifications, daily notifications, etc.). An announcement or notification may be requested at a wide variety of different times, such as during the initialization of an agent 138 or during the agent's execution. The event module 140 may process the received notifications, identify the desired events, and notify the requesting agents 138*a-n* of the desired events. For example, a suitable announcement or notification message may be communicated to an agent 138 based upon the detection or identification of an event. In certain embodiments, the event module 140 may asynchronously communicate announcements to the various agents 138*a-n* that have registered for events.

One example of the operations that may be performed by the event module 140 is described in greater detail below with reference to FIG. 5.

The resource allocation module 142 may be a suitable module that facilitates the receipt and processing of agent requests for resources of the utility meter 105, such as metrology resources and/or access to various data parameters. In operation, the resource allocation module 142 may receive a request for a resource from an agent 138. Following a determination of whether the agent 138 is permitted to access the requested resource, which may be performed by the resource allocation module 142 or the security module 144, the resource allocation module 142 may determine whether the requested resource has already been allocated to an agent. In the event that the resource has already been allocated, the resource allocation module 142 may add the requesting agent 138 to a queue or waiting list for accessing the resource. The resource may then be allocated or assigned to the resource allocation module 142 when the resource is free. In the event that the resource is free when requested, the resource allocation module 142 may allocate the resource to the requesting agent 138. The allocation of a resource to an agent 138 may "lock" the resource and prevent other agents from accessing and/or modifying the resource. For example, a data variable or parameters may be allocated to an agent 138, and the data variable may not be modified by a second agent while it is allocated to the first agent.

One example of the operations that may be performed by the resource allocation module 142 is described in greater detail below with reference to FIG. 3.

The security module 144 may be a suitable module that facilitates a wide variety of security procedures with respect to the agents 138*a-n*, such as validating bytecode signatures of the agents 138*a-n* and/or determining whether the agents 138*a-n* are permitted to access various resources and/or to request certain event notifications. In certain embodiments, the security module 144 may validate a bytecode signature of an agent 138 prior to the initiation or execution of the agent 138 by the utility meter 105. For example, the security module 144 may evaluate the bytecode signature of an agent 138 to ensure that the bytecode has not been tampered with or modified. As desired, the security module 144 may additionally determine based upon the signature whether the bytecode is allowed or permitted to execute on the utility meter 105. For example, the security module 144 may evaluate a wide variety of rules or parameters, such as rules specified by a utility provider or device manufacturer and, based upon the evaluation, the security module 144 may determine whether an agent 138 may be executed by the utility meter 105.

Additionally, in certain embodiments, the security module 144 may determine whether an agent 138 is permitted to access a requested resource and/or to receive a requested announcement or notification. For example, the security module 144 may evaluate or analyze a wide variety of access parameters and/or permissions associated with an agent 138 in order to determine whether access to a requested resource or registration for an announcement is permitted.

A few examples of the operations that may be performed by the security module 144 are described in greater detail below with reference to FIGS. 2, 3, and 5.

The watchdog module 146 may be a suitable module that facilitates the monitoring of agents 138*a-n* in order to identify situations in which the agents 138*a-n* lock up, freeze, and/or execute improperly. In certain embodiments, the watchdog module 146 may monitor agents 138*a-n* to which resources have been allocated, and the watchdog module 146 may determine whether the resources are released or freed up by the agents 138*a-n* within an expected and/or reasonable period of time. For example, once a resource has been allocated to an agent 138, the watchdog module 146 may determine whether the agent 138 releases the resource within a predetermined period of time. In the event that the agent 138 does not release the resource within the predetermined period of time, the watchdog module 146 may terminate the agent 138. For example, the watchdog module 146 may determine that the agent 138 has likely frozen, and the agent 138 may be terminated. As a result, other agents may be permitted to access the resource.

As desired in certain embodiments, the watchdog module 146 may also evaluate executing agents 138*a-n* in order to determine whether expected announcements are received from the agents 138*a-n*. For example, an agent 138 may be required to periodically announce itself to the watchdog module 146 by communicating a suitable announcement message to the watchdog module 146. In the event that the watchdog module 146 does not receive an announcement message from an agent 138 within a predetermined or expected period of time, the watchdog module 146 may determine whether the agent 138 is waiting for a resource that is locked by another agent. In the event that the agent 138 is waiting for a resource, the watchdog module 146 may permit the agent 138 to continue execution. However, in the event that the agent 138 is not waiting for a resource, the watchdog module 146 may terminate the agent.

As desired, during the termination of an agent 138, the watchdog module 146 may save a wide variety of information associated with the agent 138, such as a bytecode stack and/or state relevant information. The saved information may be utilized for diagnostic purposes. Additionally, any resources locked by the terminated agent 138 may be released or freed. A terminated agent 138 may optionally be restarted. For example, the agent 138 may be restarted utilizing the same bytecode after an acceptable period of time. If the agent 138 is repeatedly restarted and terminated either a certain number of times or within a certain amount of time, the watchdog module 146 may permanently disable the agent 138 and prevent the agent from restarting.

A few examples of the operations that may be performed by the watchdog module 146 are described in greater detail below with reference to FIGS. 3 and 4.

The metrology module 136 may be a suitable module configured to collect metrology data for use and/or storage by the utility meter 105. In operation, the metrology module 136 may receive measurements data collected by the sensors 126, and the metrology module 136 may store a wide variety of parameters associated with the received measurements data. For example, the metrology module 136 may store usage data in a memory 122 associated with the utility meter 105. As desired, the stored data may then be accessed by the various agents 138*a-n*. Additionally, the data may be utilized to identify a wide variety of different events and/or to trigger event notifications that are communicated to the various agents 138*a-n*.

The one or more network interfaces 124 may facilitate connection of the utility meter 105 to any number of suitable networks and/or transmission means. Examples of suitable network interfaces include, but are not limited to, cellular interfaces, WiMAX interfaces, power line carrier ("PLC") and/or broadband over power line ("BPL") interfaces, cable modem interfaces, digital subscriber line ("DSL") interfaces, and/or any other suitable interfaces. In certain embodiments, the network interfaces 124 may facilitate connection of the meter to one or more suitable AMI networks. As desired, any number of suitable communications cards, transceivers, transducers, adaptors, radios, and/or other devices may be utilized to interface the utility meter 105 to any number of suitable transmission networks, such as a network that facilitates Internet-based communications. In certain embodiments, communications devices and/or communications circuits (e.g., cards, transceivers, transducers, etc.) may be included, incorporated, or integrated into the utility meter 105. In other embodiments, communications devices and/or communications circuits may be external to the utility meter 105 and connected to the utility meter 105 via any number of suitable plugs, pins, wires, and/or other connections.

The one or more sensors 126 may include any suitable sensor devices configured to collect measurements data associated with the operation of the utility meter 105. For example, the sensors 126 may include voltage sensors, current sensors, variable ampere reactive sensors, flow sensors, and/or other suitable devices configured to collect readings and/or other measurements. In this regard, usage data may be collected by the utility meter 105 for processing and/or output.

With continued reference to FIG. 1, any number of head end devices 110a-n (individually referred to as a head end device 110) may be provided. Each head end device 110 may be a suitable device and/or system configured to communicate commands to (e.g., configuration commands, program file-related commands, etc.) and/or receive messages and/or information from any number of utility meters, such as the utility meter 105 described above. In certain embodiments, each head end device 110 may be a head end device associated with a utility provider and/or an Advanced Meter Infrastructure ("AMI") network associated with the utility provider.

Each head end device 110 may be a suitable processor-driven device that facilitates communication with a corresponding agent 138 executed by the utility meter 105. In this regard, each head end device 110 may be configured to receive data and/or messages output by an associated agent 138 and/or to communicate instructions and/or updates to the agent 138. As desired, each head end device 110 may include any number of suitable computer processing components, such as application-specific circuits, microcontrollers, minicomputers, personal computers, server computers, other computing devices, and the like. As such, each head end device 110 may include any number of processors, memories, and/or network interfaces that facilitate communication with an agent 138 and/or the processing of data (e.g., utility consumption data, etc.) received from an agent 138.

The one or more networks 115 may include any number of suitable networks that facilitate communications between the various components of the system 100, such as the head end devices 110a-n and the utility meter 105. For example, the one or more networks 115 may include any number of suitable wide area networks, such as a cellular network, a broadband over power line network, a satellite-based network, a telephone network, a cable network, an Advanced Metering Infrastructure ("AMI") network, a proprietary network associated with a utility service provider, and/or any network in which network traffic is shared among a plurality of devices.

As desired, embodiments of the invention may include a system 100 with more or less than the components illustrated in FIG. 1. The system 100 of FIG. 1 is provided by way of example only.

FIG. 2 is a flow diagram of an example method 200 for executing and managing multiple collection agents by a utility meter, according to an illustrative embodiment of the invention. The method 200 may be utilized in association with one or more utility meter systems, such as the system 100 illustrated in FIG. 1. In certain embodiments, the operations of the method 200 may be performed by at least one utility meter, such as the utility meter 105 illustrated in FIG. 1. The method 200 may begin at block 205.

At block 205, a plurality of collection agents may be identified by the utility meter 105. For example, respective bytecodes associated with any number of agents, such as the agents 138a-n illustrated in FIG. 1, may be identified by the utility meter 105. In certain embodiments, a plurality of agents may be identified simultaneously or within a relatively short period of time, such as during a reboot or start-up of the utility meter 105. In other embodiments, different agents may be identified at different points in time.

At block 210, a next agent may be selected by the utility meter 105 for evaluation and/or execution. At block 215, a bytecode signature associated with the agent may be identified and validated. For example, a security module, such as the security module 144 illustrated in FIG. 1, may evaluate the bytecode signature of an agent to ensure that the bytecode has not been tampered with or modified. As desired, an evaluation may also be performed based upon the signature to assess whether the bytecode for the agent is allowed or permitted to execute on the utility meter 105. For example, the security module 144 may evaluate a wide variety of rules or parameters, such as rules specified by a utility provider or device manufacturer, and the rules evaluation may be utilized to determine whether the agent may be executed by the utility meter 105. As one example, rules that define required agent operating parameters and/or capabilities may be utilized to evaluate an agent.

At block 220, a determination may be made as to whether the selected agent is permitted to be executed by the utility meter 105. If it is determined at block 220 that the agent is not permitted to be executed, then operations may continue at block 230 described in greater detail below. If, however, it is determined at block 220 that the agent is permitted to be executed, then operations may continue at block 225. At block 225, an instance of the selected agent may be initiated and/or executed by the utility meter 105. Operations may then continue at block 230.

At block 230, a determination may be made as to whether an end of the agents 138a-n has been reached. If it is determined at block 230 that the end of the agents 138a-n has not been reached, then operations may continue at block 210, and a next agent may be selected for processing. If, however, it is determined at block 230 that the end of the agents 138a-n has been reached, then operations may continue at block 235. At block 235, the executing agents may be monitored and/or managed by the utility meter 105 and/or an associated management module, such as the management module 134 illustrated in FIG. 1. For example, event registrations and/or notifications, resource allocation, security, and/or time-out conditions may be monitored and/or managed with respect to the executing agents.

The method 200 may end following block 235.

In certain embodiments of the invention, a utility meter may monitor and/or control the allocation of resources to executing agents. FIG. 3 is a flow diagram of an example method 300 for managing the allocation of resources to multiple collection agents, according to an illustrative embodiment of the invention. The method 300 may be utilized in association with one or more utility meter systems, such as the system 100 illustrated in FIG. 1. In certain embodiments, the operations of the method 300 may be performed by at least one utility meter, such as the utility meter 105 illustrated in FIG. 1. The method 300 may begin at block 305.

At block 305, a request for a designated resource, such as a metrology resource (e.g., a data parameter, etc.), may be received from an agent, such as an agent 138 illustrated in FIG. 1. In certain embodiments, the request may be received by a suitable resource allocation module associated with the utility meter 105, such as the resource allocation module 142 illustrated in FIG. 1.

At block 310, a determination may be made as to whether the requesting agent 138 is permitted or allowed to access the requested resource. For example, the resource allocation module 142 may invoke a security module, such as the security module 144 illustrated in FIG. 1, to determine whether the agent 138 has permission to access the requested resource. The security module 144 may evaluate a wide variety of access parameters associated with the resource and/or permission levels (and/or processing capabilities) associated with the agent 138 in order to determine whether the agent 138 is allowed to access the requested resource. If it is determined at block 310 that the agent 138 is not allowed to access the resource, then operations may end. As desired, a suitable error message may be returned to the agent 138.

If, however, it is determined at block 310 that the agent 138 is allowed to access the requested resource, then operations may continue at block 315. At block 315, a determination may be made by the resource allocation module 142 as to whether the resource has been allocated to another agent. In other words, a determination may be made as to whether the resource has been locked by another agent. If it is determined at block 315 that the resource has not been allocated to another agent, then operations may continue at block 320, and the resource may be allocated to the requesting agent 138. As a result of allocating the resource to the requesting agent 138, the resource may be locked by the agent 138, and other agents may be prevented from accessing and/or modifying the resource. Operations may then continue at block 335 described below.

If, however, it is determined at block 315 that the resource has been allocated to another agent, then operations may continue at block 325, and the requesting agent 138 may be added to a queue or waiting list associated with the resource. As desired in certain embodiments, the requesting agent 138 may be added to the end of a queue. In other embodiments, priorities may be assigned to the agents executed by the utility meter 105, and the priorities may be utilized to determine the requesting agent's place in a queue. For example, an agent associated with a primary utility provider for the customer may be added to the top of the queue or wait list. The resource may subsequently be allocated to the requesting agent 138 at block 330 when the resource becomes available. For example, when the resource is released and the requesting agent 138 is the next agent in the queue, then the resource may be allocated to the requesting agent 138. Operations may then continue at block 335.

At block 335, a time period for the allocation of the resource may be monitored. As desired, the monitoring may be performed by a suitable watchdog module, such as the watchdog module 146 illustrated in FIG. 1. As an example of monitoring, a count up or count down timer or counter may be executed when the resource is allocated. As another example, a time stamp may be recorded or saved when the resource is allocated. A determination may then be made at block 340 as to whether a predetermined time threshold (e.g., expiration of a timer, a timer reaching a threshold value, etc.) for resource allocation has been reached. In other words, a determination may be made as to whether the resource has been locked by the agent 138 for a maximum allowable time period. If it is determined at block 340 that the predetermined time threshold has not been reached, then operations may continue at block 335, and the time period may continue to be monitored. If, however, it is determined at block 340 that the predetermined time threshold has been reached, then operations may continue at block 345.

At block 345, a determination may be made as to whether the resource has been returned or released by the agent 138. If it is determined at block 345 that the resource has been returned, then operations may end. If, however, it is determined at block 345 that the resource has not been returned, then operations may continue at block 350, and the agent may be terminated. In this regard, other agents may be afforded an opportunity to access the resource. Operations may then end following block 350. As an alternative to determining whether the resource has been returned once the time threshold has been reached, the monitoring of the allocation time may cease once the resource has been returned.

The method 300 may end following either block 345 or block 350.

In certain embodiments of the invention, a utility meter may monitor agents and detect agents that have timed out, locked up, or become unresponsive. FIG. 4 is a flow diagram of an example method 400 for terminating collection agents that have timed out, according to an illustrative embodiment of the invention. The method 400 may be utilized in association with one or more utility meter systems, such as the system 100 illustrated in FIG. 1. In certain embodiments, the operations of the method 400 may be performed by at least one utility meter and associated watchdog module, such as the utility meter 105 and watchdog module 146 illustrated in FIG. 1. The method 400 may begin at block 405.

At block 405, a time period for receiving announcement or annunciation messages from an executing agent, such as an agent 138 illustrated in FIG. 1, may be identified. As desired, a similar time period may be utilized for all of the executing agents. Alternatively, different time periods may be utilized for different agents. Additionally, in certain embodiments, the monitoring of time periods for different agents may be performed in an asynchronous manner. A wide variety of suitable time periods and/or timing thresholds may be utilized as desired in various embodiments of the invention. For example, an agent 138 may be expected to communicate an annunciation message every second.

At block 410, a determination may be made as to whether an annunciation message has been received from the agent 138 within the identified or determined time period. If it is determined at block 410 that an annunciation message has been received, then operations of the method 400 may end. If, however, it is determined at block 410 that an annunciation message has not been received, then operations may continue at block 415.

At block 415, a determination may be made as to whether the agent 138 is waiting on a resource that is locked by or allocated to another agent. For example, a determination may be made as to whether identifying information for the agent 138 is included in any resource queues or wait lists. If it is determined at block 415 that the agent 138 is waiting on a resource, then it may be determined that the agent 138 is likely not locked up, and operations may end. If, however, it is determined at block 415 that the agent 138 is not waiting on a resource, then operations may continue at block 420, and the agent 138 may be terminated.

The method 400 may end following either block 410, block 415, or block 420.

As desired in various embodiments of the invention, a utility meter 105 may provide a wide variety of event notifications (e.g., timing notifications, event occurrence notifications, etc.) to executing agents. FIG. 5 is a flow diagram of an example method 500 for communicating event notifications to collection agents, according to an illustrative embodiment of the invention. The method 500 may be utilized in association with one or more utility meter systems, such as the system 100 illustrated in FIG. 1. In certain embodiments, the operations of the method 500 may be performed by at least one utility meter, such as the utility meter 105 illustrated in FIG. 1. The method 500 may begin at block 505.

At block 505, a registration request for an event announcement or event notification may be received from an agent, such as an agent 138 illustrated in FIG. 1. In certain embodiments of the invention, the registration request may be received by a suitable event module, such as the event module 140 illustrated in FIG. 1. A wide variety of different types of events may be identified by a registration request including, but not limited to, timer-based events, time management events, and/or events associated with the occurrence of predetermined conditions. Additionally, a request may be received at a wide variety of different points in time, such as during the initialization of the agent 138 and/or during the execution or operation of the agent 138.

At block 510, a determination may be made as to whether the agent is permitted to receive notification of the event associated with the received registration request. For example, the event module 140 may invoke a security module, such as the security module 144 illustrated in FIG. 1, to determine whether the agent 138 has permission to receive notification for the event. The security module 144 may evaluate a wide variety of access parameters associated with the event and/or permission levels (and/or processing capabilities) associated with the agent 138 in order to determine whether the agent 138 is allowed to receive notification of the event. If it is determined at block 510 that the agent 138 is not allowed to receive notification of the event, then operations may end. As desired, a suitable error message may be returned to the agent 138. If, however, it is determined at block 510 that the agent 138 is allowed to receive notification of the event, then operations may continue at block 515.

At block 515, the agent 138 may be registered by the event module 140 for event notification. In other words, the agent 138 may be added to a notification list, and the agent 138 may be notified by the event module 140 upon each detection of the event. For example, the event module 140 may detect the occurrence of the event at block 520, and a notification announcement or notification message for the event may be prepared and communicated to the agent 138 at block 525. In this regard, the agent 138 may take action based upon the occurrence of the event. For example, the agent 138 may initiate the execution of suitable computer-implemented instructions that facilitate the collection of usage data and/or the communication of usage data to a head end device.

The method 500 may end following either block 510 or block 525.

The operations described and shown in the methods 200, 300, 400, and 500 of FIGS. 2-5 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 2-5 may be performed.

The invention is described above with reference to block and flow diagrams of systems, methods, apparatus, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method, comprising:
    executing, by a utility meter comprising one or more computer processors, a first software agent configured to collect utility usage data on behalf of a first utility provider;
    executing, by the utility meter concurrently with the first software agent, a second software agent configured to collect utility usage data on behalf of a second utility provider; and
    managing, by the utility meter, allocation of resources to the first software agent and the second software agent, wherein managing the allocation of resources comprises receiving, from the first software agent by a resource allocation module associated with the utility meter, a request to access a resource.

2. The method of claim 1, wherein managing the allocation of resources further comprises:
allocating, by the resource allocation module, the requested resource to the first software agent, wherein the second software agent is not permitted to modify the resource while the resource is allocated to the first software agent.

3. The method of claim 2, wherein allocating the requested resource comprises allocating a metrology resource associated with the collection of utility usage data by the utility meter.

4. The method of claim 2, further comprising:
determining, by a security module associated with the utility meter, that the first software agent has permission to access the resource,
wherein allocating the requested resource comprises allocating the requested resource subsequent to determining that the first software agent has permission to access the resource.

5. The method of claim 2, further comprising:
determining, by a watchdog module associated with the utility meter, whether the first software agent releases the resource within a predetermined period of time; and
terminating, by the watchdog module, the first software agent if it is determined that the first software agent does not release the resource within the predetermined period of time.

6. The method of claim 1, further comprising:
validating, by a security module associated with the utility meter, a first bytecode signature associated with the first software agent and a second bytecode signature associated with the second software agent,
wherein executing the first software agent and the second software agent comprises executing the first software agent and the second software agent based at least in part upon the validation.

7. The method of claim 1, further comprising:
receiving, from the first software agent by an event module associated with the utility meter, a registration request for an announcement associated with a designated event; and
communicating, by the event module to the first software agent upon the occurrence of the designated event, the requested announcement.

8. The method of claim 1, further comprising:
determining, by a watchdog module associated with the utility meter, whether an annunciation message is received from the first software agent within a predetermined period of time; and
terminating, by the watchdog module, the first software agent if it is determined that the annunciation message has not been received.

9. The method of claim 8, further comprising:
determining, by the watchdog module, whether the first software agent is waiting for a resource allocated to the second software agent,
wherein terminating the first software agent comprises terminating the first software agent based upon a determination that the first software agent is not waiting for a resource allocated to the second software agent.

10. A utility meter, comprising:
at least one memory configured to store computer-executable instructions associated with a first software agent and a second software agent; and
at least one processor configured to access the at least one memory and execute the computer-executable instructions to:
execute the first software agent to collect utility usage data on behalf of a first utility provider; and
execute the second software agent to collect utility usage data on behalf of a second utility provider,
wherein the at least one memory further comprises additional computer-executable instructions associated with software management,
and wherein the at least one processor is further configured to manage the allocation of resources to the first software agent and the second software agent by executing the additional computer-executable instructions to:
receive, from the first software agent, a request to access a resource.

11. The utility meter of claim 10, wherein the at least one processor is configured to manage the allocation of resources by further executing the additional computer-executable instructions to:
allocate the requested resource to the first software agent, wherein the second software agent is not permitted to modify the resource while the resource is allocated to the first software agent.

12. The utility meter of claim 11, wherein the resource comprises a metrology resource associated with the collection of utility usage data by the utility meter.

13. The utility meter of claim 11, wherein the at least one processor is further configured to execute the additional computer-executable instructions to:
determine that the first software agent has permission to access the resource; and
wherein the requested resource is allocated subsequent to determining that the first software agent has permission to access the resource.

14. The utility meter of claim 11, wherein the at least one processor is further configured to execute the additional computer-executable instructions to:
determine whether the first software agent releases the resource within a predetermined period of time; and
terminate the first software agent if it is determined that the first software agent does not release the resource within the predetermined period of time.

15. The utility meter of claim 10, wherein the at least one memory further comprises additional computer-executable instructions associated with software agent management, and
wherein the at least one processor is further configured to execute the additional computer-executable instructions to:
validate a first bytecode signature associated with the first software agent and a second bytecode signature associated with the second software agent; and
execute the first software agent and the second software agent based at least in part upon the validation.

16. The utility meter of claim 10, wherein the at least one memory further comprises additional computer-executable instructions associated with software agent management, and
wherein the at least one processor is further configured to execute the additional computer-executable instructions to:
receive, from the first software agent, a registration request for an announcement associated with a designated event; and
communicate, to the first software agent upon the occurrence of the designated event, the requested announcement.

17. The utility meter of claim 10, wherein the at least one memory further comprises additional computer-executable instructions associated with software agent management, and wherein the at least one processor is further configured to execute the additional computer-executable instructions to:
  determine whether an annunciation message is received from the first software agent within a predetermined period of time; and
  terminate the first software agent if it is determined that the annunciation message has not been received.

18. The utility meter of claim 17, wherein the at least one processor is further configured to execute the additional computer-executable instructions to:
  determine whether the first software agent is waiting for a resource allocated to the second software agent; and
  terminate the first software agent based upon a determination that the first software agent is not waiting for a resource allocated to the second software agent.

* * * * *